(12) United States Patent
Sauder, Jr.

(10) Patent No.: US 7,565,849 B2
(45) Date of Patent: Jul. 28, 2009

(54) ACTUATOR AND ACTUATION METHOD

(75) Inventor: John A. Sauder, Jr., Conroe, TX (US)

(73) Assignee: Capro Ltd, Willis, TX (US)

( * ) Notice: Subject to any disclaimer, the term of this patent is extended or adjusted under 35 U.S.C. 154(b) by 628 days.

(21) Appl. No.: 11/259,265

(22) Filed: Oct. 27, 2005

(65) Prior Publication Data

US 2006/0117899 A1    Jun. 8, 2006

Related U.S. Application Data

(60) Provisional application No. 60/622,462, filed on Oct. 27, 2004.

(51) Int. Cl.
*G05G 1/08* (2006.01)

(52) U.S. Cl. ...................................... 74/507

(58) Field of Classification Search .............. 74/500.5, 74/501.6, 502.2, 503, 507, 516; 292/22, 292/39, 270, 280
See application file for complete search history.

(56) References Cited

U.S. PATENT DOCUMENTS 4,313,349 A * 2/1982 Heitman et al. ............... 74/507

6,212,969 B1 * 4/2001 Kuo ........................... 74/500.5
6,217,087 B1 * 4/2001 Fuller ........................... 292/39
6,676,174 B2 * 1/2004 Reynolds et al. .............. 292/32
7,407,200 B2 * 8/2008 Ichimaru ...................... 292/194

FOREIGN PATENT DOCUMENTS

DE          3314229 A1 * 10/1984

* cited by examiner

*Primary Examiner*—Vicky A Johnson
(74) *Attorney, Agent, or Firm*—Baker & Hostetler LLP

(57) ABSTRACT

An actuator that is capable of taking a relatively small amount of force or displacement input therein and of outputting a relatively large amount of force or displacement. The actuator includes a translating component and a plurality of levers or arms. The increase in force or displacement is achieved by adequately selecting the relative lengths of and positioning the levers or arms. Also, an actuation method for transforming an input of a relatively small amount of force or displacement into an output of a relatively large amount of force or displacement.

1 Claim, 4 Drawing Sheets

ACTUATOR AND ACTUATION METHOD

CROSS-REFERENCE TO RELATED APPLICATIONS

This application claims priority to the provisional U.S. patent application entitled, "Dual Cable Release Actuator," filed Oct. 27, 2004, having a Ser. No. 60/622,462, now pending, the disclosure of which is hereby incorporated by reference in its entirety.

FIELD OF THE INVENTION

The present invention relates generally to actuators and to actuation methods. More particularly, the present invention relates to actuators and actuation methods configured to output a force and/or amount of displacement that is different from an input force and/or amount of displacement.

BACKGROUND OF THE INVENTION

Currently-available actuators are implemented in a variety of mechanical and electromechanical systems. However, currently-available actuators that have relatively small amounts force and/or displacement input into them are not amenable to being included in devices or systems that would require the actuator to output a relatively large amount of force and/or displacement (i.e., travel).

For example, currently-available actuators are often connected to push buttons and are engaged when a user depresses the push button a relatively short distance and with a relatively small amount of force. Pursuant to being engaged, these currently-available actuators are only capable of outputting a relatively small amount of force and displacement. Therefore, they cannot be incorporated in devices and systems where a large amount of force or displacement is needed.

One example of a device or system where a currently-available actuator would not be suitable is in a removable cover for a pick-up truck bed. Such a cover, instead of having one or more actuators incorporated therein, make use of handles and/or levers to release hooks that attach the cover to the sides of the pick-up bed. Unfortunately, the levers and/or handles are relatively large, bulky and expensive. Therefore, the cover itself is also relatively large, bulky and expensive. In addition, frail or injured persons may have difficulty applying enough force to the handles and/or levers to release the cover from the truck bed to which it is attached.

At least in view of the above, it would be desirable to provide actuators that output a relatively large amount of force or displacement pursuant to being engaged with a relatively small amount of force or displacement. In addition, it would be desirable to provide actuation methods that output a relatively large amount of force or displacement pursuant to a relatively small amount of force or displacement being input.

SUMMARY OF THE INVENTION

At least some of the foregoing needs are met by a first embodiment of the present invention, wherein an actuator is provided. The actuator includes an input connection configured to be connected to a user interface. The actuator also includes a first output connection connected to the input connection. In addition, the actuator also includes a translating component connected to the input connection and configured to translate between a primary position and a secondary position upon the user interface being engaged. The actuator further includes a primary lever communicating with the translating component. The primary lever is configured to rotate when the translating component translates between the primary position and the secondary position. The actuator also includes a secondary lever that is offset from and fixedly connected to the primary lever. The secondary lever is connected to the first output connection. The secondary lever is also configured to rotate when the primary lever rotates. In addition, the primary lever has a first length and the secondary lever has a second length.

According to another embodiment of the present invention, a method of actuating a system is provided. The method includes engaging a user interface. The method also includes translating a first component between a primary position and a secondary position upon the user interface being engaged. The method further includes rotating a primary lever upon the translating component translating. The method also includes rotating a secondary lever upon the primary lever rotating. Also, the secondary lever is offset from and fixedly connected to the primary lever.

According to yet another embodiment of the present invention, another actuator is provided. This actuator includes first connecting means for connecting to a user interface. This actuator also includes second connecting means for connecting to an output and is connected to the first connecting means. This actuator further includes translating means for translating between a primary position and a secondary position upon the user interface being engaged. In this actuator, the translating means is connected to the first connecting means. This actuator also includes first rotating means for rotating about an axis. In this actuator, the first rotating means extends between the translating means and the axis. Also, the first rotating means is configured to rotate about the axis upon the translating means translating between the primary position and the secondary position. This actuator further includes second rotating means for rotating about the axis. The second rotating means is offset from and fixedly connected to the first rotating means. The second rotating means also extends between the axis and the second connecting means. Further, the second rotating means is configured to rotate about the axis upon the first rotating means rotating about the axis. In addition, the first rotating means and the second rotating means have different lengths.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
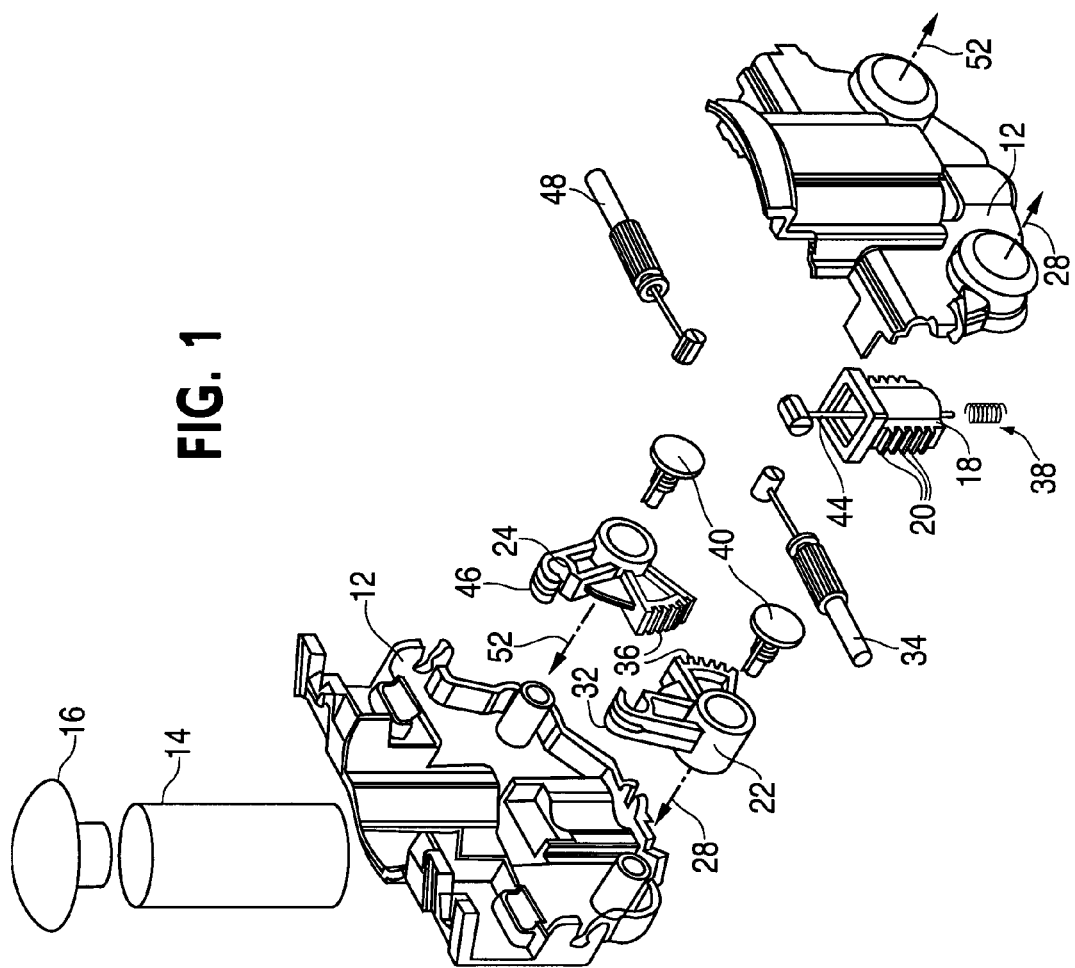
FIG. 1 is an exploded view of an actuator according to a first embodiment of the present invention.

Certain embodiments of the present invention will now be described with reference to the drawing figures, in which like reference numerals refer to like parts throughout. FIG. 1 is an exploded view of an actuator 10 according a first embodiment of the present invention. The actuator 10 is encased within a housing 12 that surrounds all of the components of the actuator 10 illustrated in FIG. 1, except for the user interface 16, at least part of which typically extends outside of the housing 12, and the input connection 14, at least part of which extends outside of the housing 12 in some embodiments of the present invention.

Figure 2:
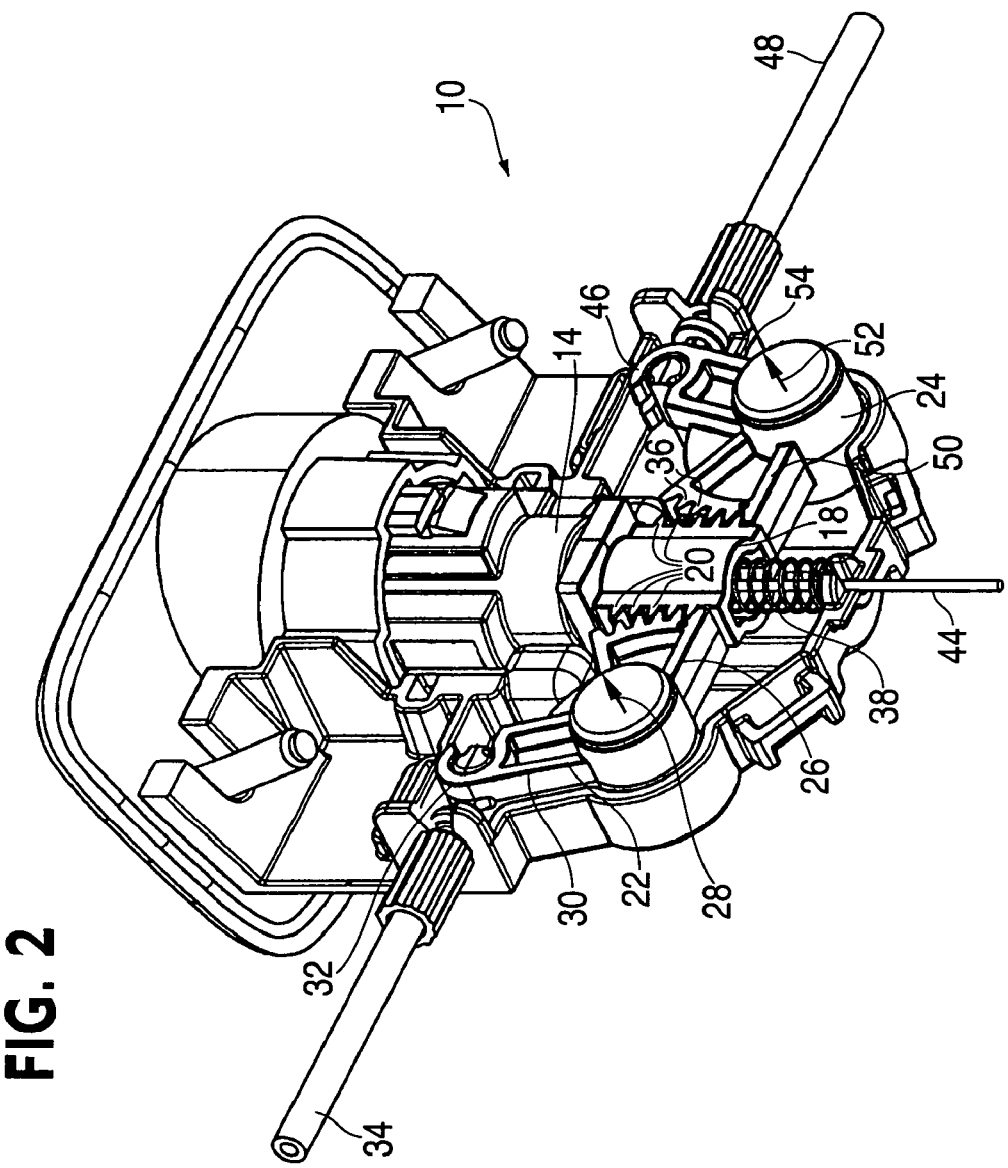
FIG. 2 is a perspective view of the actuator illustrated in FIG. 1 wherein the housing has been removed and wherein all of the components of the actuator are engaged with each other.

FIG. 2 is a perspective view of the actuator 10 illustrated in FIG. 1 wherein one side of the housing 12 has been removed and wherein all of the components of the actuator 10 are engaged with each other. As illustrated in FIG. 2, the actuator 10 includes the input connection 14 that is, as illustrated in FIG. 1, connected to the user interface 16. According to certain embodiments of the present invention, the user interface 16 includes a push button that may be depressed by a user to engage the actuator 10. However, other user interfaces are also within the scope of the present invention, particularly those user interfaces that allow a user to input force and/or pressure to the input connection 14 of the actuator 10 (e.g., switches).

The input connection 14 illustrated in FIGS. 1 and 2 is illustrated as being in the form of a solid component that extends between the user interface 16 and a translating component 18 that is included in the actuator 10. The input connection 14 may, for example, take the form of a rod, a cylinder or one or more other objects that extend between the user interface 16 and the translating component 18.

In FIGS. 1 and 2, the translating component 18 takes the form of a rack gear having a plurality of teeth 20 and is connected to the input connection 14. When the user interface 16 is not engaged (e.g., when a user is not depressing the push button), the translating component 18 is in the primary position illustrated in FIG. 2. However, when the user interface 16 is engaged, the translating component 18 of the actuator 10 illustrated in FIG. 2 moves to the secondary position illustrated in FIG. 3. The translating component 18 typically translates linearly between the primary position and the secondary position upon the user interface 16 being engaged, but some embodiments of the present invention allow for the translating component 18 to translate non-linearly as well. Further, according to other embodiments of the present invention, the translating component 18 rotates and/or undergoes other kinds of motion beyond pure translation.

Figure 3:
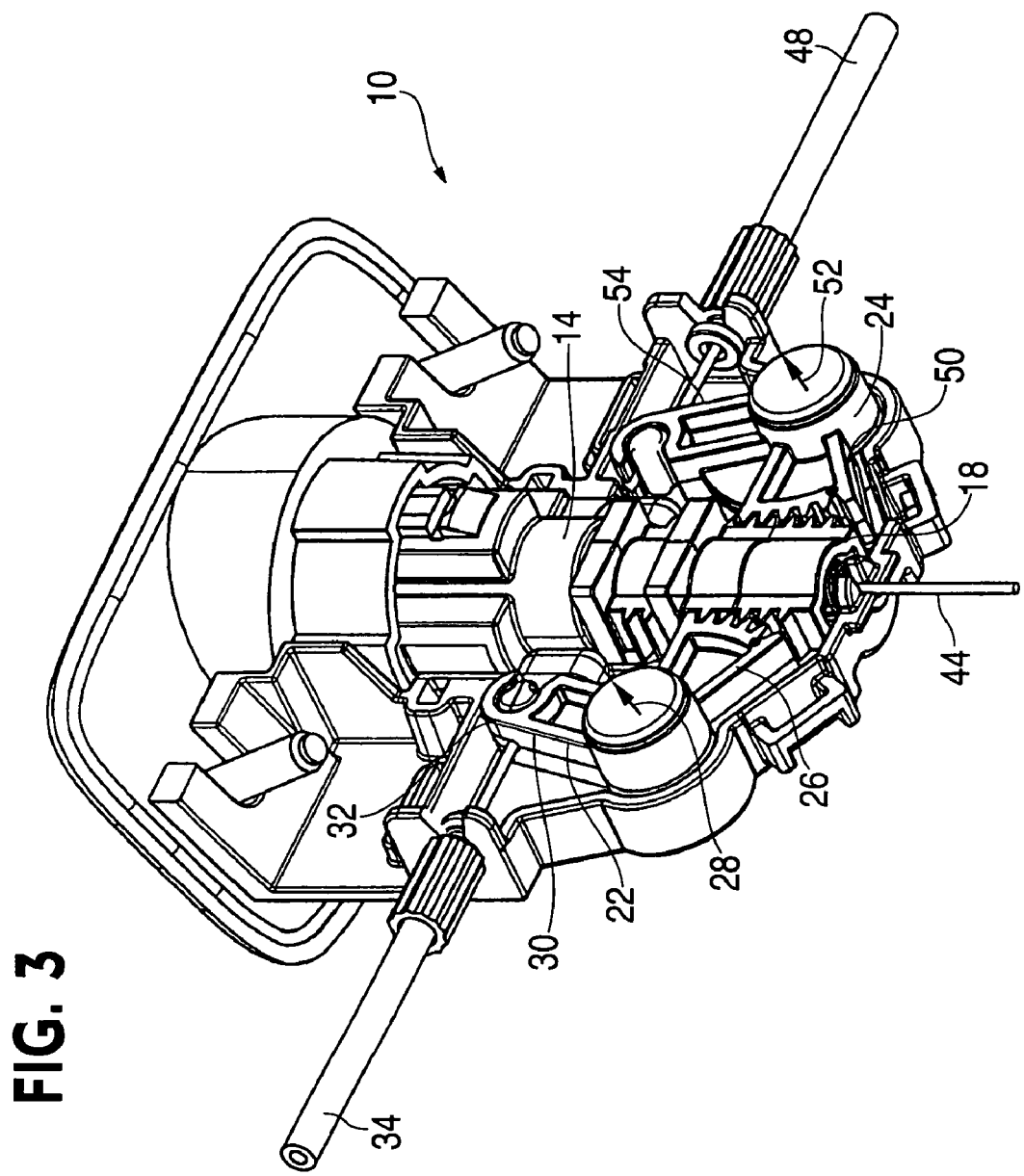
FIG. 3 illustrates the actuator illustrated in FIG. 2 wherein the translating component 18 is in a secondary position.

In addition to the above-discussed component, the actuator 10 illustrated in FIGS. 1-3 also includes a left-side gear lever 22 and a right-side gear lever 24 positioned on either side of the translating component 18. The left-side gear lever 22 includes a first arm 26 that functions as a primary lever extending between the translating component 18 and a first axis 28 about which the left-side gear lever 22 rotates. The left-side gear lever 22 also includes a second arm 30 that is offset from and fixedly connected to the first arm 26. The second arm 30 functions as a secondary lever and extends between the first axis 28 and a first output connection 32. In turn, the first output connection 32 has a left-side cable 34 removably connected thereto. Although the first arm 26 and second arm 30 illustrated in FIGS. 1-3 are incorporated within a single gear lever 22, according to alternate embodiments of the present invention, the two arms 26, 30 may be included as individual components within the actuator 10.

As illustrated in FIGS. 1-3, the first arm 26 includes a set of lever arm teeth 36 that engage with the above-discussed set of rack gear teeth 20 on the translating component 18. Although the set of rack gear teeth 20 and the set of lever arm teeth 36 illustrated in FIGS. 1-3 are all substantially identical in geometry, alternate embodiments of the present invention allow for the teeth on the translating component 18 and left-side gear lever to be of differing geometries. It should also be noted that, although the use of gear teeth in the above-discussed actuator 10 reduces the likelihood of slippage, other embodiments of the present invention can use friction and/or other mechanisms instead of gear teeth for engaging the translating component 18 and the first arm 26.

As the translating component 18 moves/translates between the primary position illustrated in FIG. 2 and the secondary position illustrated in FIG. 3, the first arm 26, which is engaged with the translating component 18, rotates about the first axis 28. Since it is fixedly connected to the first arm 26, the second arm 30 also rotates about the first axis 28.

The first arm 26 and the second arm 30 may be configured to have substantially equal lengths. However, the first arm 26 and the second arm 30 illustrated in FIGS. 1-3 have different lengths. According to certain embodiments of the present invention, the length of the second arm 30 is greater that the length of the first arm 26. According to such embodiments, when the user interface 16 is depressed and causes translation of the translating component 18, the portion of the first arm 26 furthest from the first axis 28 is moved a first distance about the first axis 28 and the portion of the second arm 30 furthest from the first axis 28 is moved a second distance about the first axis 28 that is greater than the first distance. As such, a relatively small displacement of the translating component 18 can cause the second arm 30 to move a relatively large distance. Also, since the second arm 30 is connected to the left-side cable 34 through the first output connection 32, the left-side cable 34 is pulled a relatively large distance. When using such an embodiment, the displacement input by a user through the user interface 16 may be magnified and output through the left-side cable 34 or some other component that is connected to the actuator 10.

According to other embodiments of the present invention, the length of the second arm 30 is less than the length of the first arm 26. According to such embodiments, the portion of the second arm 30 that is furthest from the first axis 28 moves a relatively short distance compared to the distance traveled by the portion of the first arm 26 that is furthest from the first axis 28. However, by virtue of being shorter than the first arm 26, the second arm 30 benefits from a mechanical advantage and is therefore capable of exerting a relatively large amount of force on the left-side cable 34. When using such an embodiment, the force input by a user through the user interface 16 may be magnified and output through the left-side cable 34 or some other component that is connected to the actuator 10.

FIGS. 1-3 also illustrate that the actuator 10 includes a return spring 38 that is adjacent to the translating component 18. According to certain embodiments of the present invention, the return spring 38 applies little or substantially no force to any portion of the actuator 10 while the translating component 18 is in the primary position illustrated in FIG. 2. However, when the translating component 18 is the secondary position illustrated in FIG. 3, the return spring 38 biases the translating component 18 to the primary position. According to these embodiments, the return spring 38 thereby assures that, once the user interface 16 is released after being engaged by a user, the user interface 16 return to its initial position. Thus, when the user interface 16 is a push button, once a user stops depressing the push button, the button "pops-up" or returns to its original position.

Figure 4:
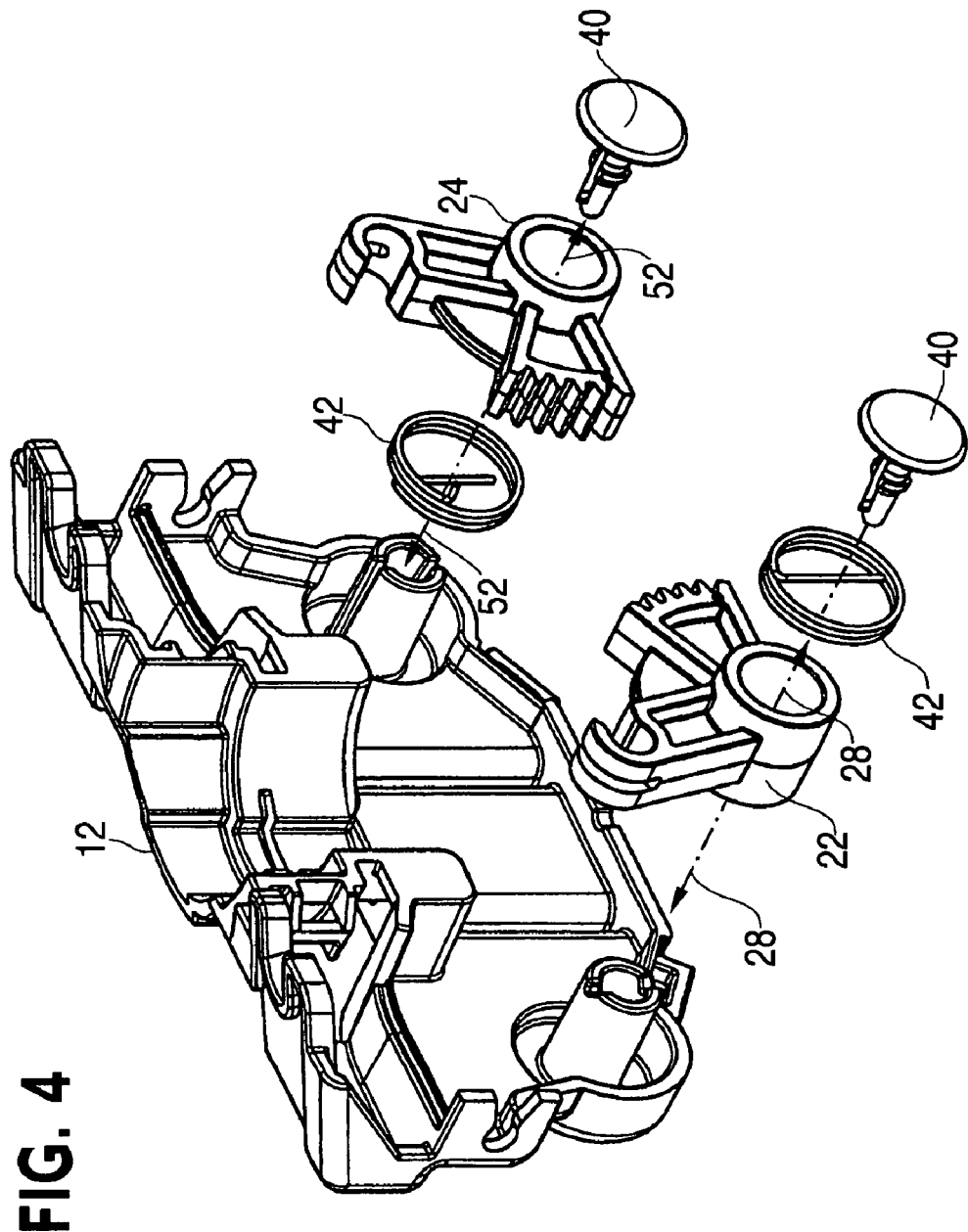
FIG. 4 is an exploded view of a portion of the actuator illustrated in FIGS. 1-3.

FIG. 4 is an exploded view of a portion of the actuator 10 illustrated in FIGS. 1-3. As illustrated in FIG. 4, the left-side gear lever 22 and the right-side gear lever 24 are both attached to the housing 12 using retaining caps 40. However, alternate methods of connecting the gear levers 22, 24 to one or more of the other components of the actuator 10 are also within the scope of the present invention. For example, rivets, bolts and/or pins may be used.

Also illustrated in FIG. 4 are two torsional springs 42, one of which is positioned adjacent to each of the gear levers 22, 24 discussed above. In the actuator 10 illustrated in FIG. 4, when either of the gear levers 22 rotates from a primary lever position (illustrated in FIG. 2) to a secondary lever position (illustrated in FIG. 3) as a result of the translating component 18 translating between the primary and secondary positions above, at least one of the torsional springs 42 gets compressed and begins biasing the respective gear lever 22, 24 to the primary lever position. In other words, at least one torsional spring 42 biases at least one of the gear levers 22, 24 toward the position that the gear lever 22, 24 was in when the translating component 18 was in the primary position. Since each gear lever 22, 24 is connected with the user interface 16 through the translating component 18 and input connection 14, each of the torsional springs 42, like the return spring 38, ensures that the user interface 16 returns to an initial position when the user interface 16 is no longer being depressed or otherwise engaged by a user.

As illustrated in FIG. 2, the actuator 10 also includes an auxiliary connection 44 that may be connected to one or more of the components included in the actuator 10. According to certain embodiments of the present invention, the auxiliary connection 44 is configured to be connected to an auxiliary input (not shown) that may be used to engage the actuator 10 in a manner alternate to using the user interface 16. For example, the auxiliary connection 44 may be connected to an auxiliary input (e.g., a handle or latch) that, when pulled (i.e., engaged), pulls the auxiliary connection 44 downward. The auxiliary connection 44, in turn, pulls the translating component 18 into the secondary position discussed above.

According to certain embodiments of the present invention, the auxiliary connection 44 is connected to a trunk release mechanism. According to such embodiments, the actuator 10 is used to effectuate the opening and closing of the trunk of an automobile. If a person were to get stuck within the trunk and were therefore unable to engage the user interface 16 on the outside of the automobile, the person would still be able to engage the trunk release mechanism (e.g., a trunk release handle on the inside of the trunk). The trunk release mechanism would apply a force to (e.g., pull) the auxiliary connection 44 and thereby engage the actuator 10 and open the trunk.

Although the first output connection 32 illustrated in FIG. 2 is connected to a cable, other types of components may be engaged with the actuator 10. For example, rods or cylinders may be engaged with the actuator 10.

Although only the left-side gear lever 22 has been discussed in detail above, one of skill in the art will appreciate that the right-side gear lever 24 is substantially identical to the left-side gear lever 22 and therefore acts in a similar and complementary manner in the actuator 10. According to alternate embodiments of the present invention, the left-side gear lever 22 and the right-side gear lever 24 are substantially mirror images of each other and also act in a similar and complementary manner. According to still other embodiments of the present invention, the geometries of the left-side gear lever 22 and of the right-side gear lever 24 are different (e.g., the arms are of different lengths and/or are positioned at different angles relative to each other).

The right-side gear lever 24 includes a second output connection 46 that is engaged with a right-side cable 48. The right-side gear lever 24 also includes a third arm 50 that extends between the translating component 18 and a second axis 52. The right-side gear lever 24 is configured to rotate about the second axis 52 upon the translating component 18 translating between the above-discussed primary and secondary positions. The right-side gear lever 24 also includes a fourth arm 54 that is offset from and fixedly connected to the third arm 50. According to alternate embodiments of the present invention, the third arm 50 and fourth are 54 are individual components and not part of the same gear lever 24.

The fourth arm 54 extends between the second axis 52 and the second output connection 46. The fourth arm 54 is configured to rotate about the second axis 52 upon the third arm 50 rotating about the second axis 52 pursuant to the translating component 18 translating between the primary and secondary positions. Like the first arm 26 and second arm 30 discussed earlier, the third arm 50 and fourth arm 54 are typically of different lengths.

Upon practicing the present invention, one of skill in the art will appreciate that the lengths and relative lengths of the first arm 26, second arm 30, third arm 50 and/or fourth arm 54 are application-specific and may be selected so as to be appropriate for achieving one or more particular purposes. For example, when a greater output of force is desired on the left side of the actuator 10 illustrated in FIG. 2, the length of the second arm 30 may be shortened relative to the length of the first arm 26.

According to certain embodiments of the present invention, the length of the first arm 26 relative to the length of the second arm 30 differs from the length of the third arm 50 relative to the length of the fourth arm 54. In such embodiments, each of the cables 34, 48 is subjected to a different amount of force and/or displacement. However, according to other embodiments of the present invention, the length of the first arm 26 relative to the length of the second arm 30 is substantially equal to the length of the third arm 50 relative to the length of the fourth arm 54 and the cables 34, 48 are subjected to substantially equal amounts of force and displacement.

In the actuator 10 illustrated in FIGS. 1-4, the left-side cable 34 and the right-side cable 48, along with their respective output connections 32, 46, are positioned substantially opposite to each other. However, according to alternate embodiments of the present invention, instead of being offset by substantially 180° degrees, the two cable 34, 38 illustrated in FIGS. 1-4 may be offset at alternate angles. In addition, one of skill in the art will appreciate that, by adding additional gear levers around the translating component 18 and by including rack gear teeth 20 that extend around the translating component 18, more that two cables may be connected to the actuator 10.

The above-discussed actuator 10 includes a first arm 26 and a third arm 50 that have substantially equal lengths. Likewise, the second arm 30 and the fourth arm 54 included in the actuator 10 also have substantially equal lengths relative to each other. While this promotes symmetry and reduces the amount of torsion on the overall actuator 10, arms included in alternate embodiments of the actuator 10 may have alternate lengths.

According to yet another embodiment of the present invention, a method of actuating a system is also provided. The method includes engaging a user interface. This engaging step may be implemented, for example, by depressing a push button that functions as the user interface.

The method also includes translating a first component between a primary position and a secondary position upon the user interface being engaged. If using the actuator 10 discussed above, this translating step may be implemented by moving the translating component 18 between the above-discussed primary and secondary positions.

The method also includes rotating a primary lever about a first axis upon the translating component translating between the primary position and the secondary position. According to certain embodiments of the present invention, when implementing this step, the primary lever is chosen to extend between the translating component and the first axis. This first rotating step may be implemented for example, by rotating the first arm 26 of the left-side gear lever 22 discussed above.

The method also includes rotating a secondary lever about the first axis upon the primary lever rotating about the first axis. When implementing this step, the secondary lever is typically chosen to extend between the first axis and a first output connection. Also, the second lever is typically chosen to have a different length than the primary lever and is commonly chosen to be offset from and fixedly connected to the primary lever. This step may be implemented, for example, by rotating the second arm 30 in the actuator 10, as discussed previously.

The method further includes rotating a tertiary lever about a second axis upon the translating component translating between the primary position and the secondary position. When implementing this step, the tertiary lever is typically chosen to extend between the translating component and the second axis. The method also includes rotating a quaternary lever about the second axis upon the tertiary lever rotating about the second axis. When implementing this step, the quaternary lever is commonly chosen to be offset from and fixedly connected to the tertiary lever. Also, the quaternary lever is typically chosen to extend between the second axis and the second output connection. Also, the tertiary lever and the quaternary lever usually are chosen to have different lengths.

According to certain embodiments of the present invention, the method also includes pulling a first cable with the first output connection upon the secondary lever rotating. The method further includes pulling a second cable with the second output connection upon quaternary rotating. When implementing such embodiments, the first cable and the second cable are often positioned substantially opposite each other. However, according to other embodiments of the present invention, one, two or more cables may be pulled or pushed (if the 26, 30, 50, 54 are positioned accordingly). According to these embodiments, the plurality of cables (or other components such as, for example, cylinders and rods) may be offset from each other by almost any angle.

When implementing the above-discussed embodiments of the method, the primary lever and the tertiary lever are typically chosen to have substantially equal lengths. However, no particular restrictions are placed on the lengths or relative lengths of any of the levers or arms in actuators according to the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An actuator comprising:
an input connection configured to be connected to a user interface;
a first output connection connected to the input connection;
a translating component connected to the input connection and configured to translate between a primary position and a secondary position upon the user interface being engaged;
a primary lever communicating with the translating component and configured to rotate when the translating component translates between the primary position and the secondary position;
a secondary lever offset from and fixedly connected to the primary lever and connected to the first output connection, wherein the secondary lever is configured to rotate when the primary lever rotates and wherein the primary lever has a first length and the secondary lever has a second length
a second output connection connected to the input connection;
a tertiary lever communicating with the translating component and configured to rotate when the translating component translates between the primary position and the secondary position, wherein the primary lever and the tertiary lever have substantially equal lengths; and
a quaternary lever offset from and fixedly connected to the tertiary lever and connected to the second axis and the second output connection, wherein the quaternary lever is configured to rotate when the tertiary lever rotates and wherein the tertiary lever has a first length and the quaternary lever has a second length.

* * * * *